(12) United States Patent
Abrahams

(10) Patent No.: US 9,409,375 B2
(45) Date of Patent: Aug. 9, 2016

(54) ANTI-SLIP COVERINGS FOR SURFACES

(71) Applicant: Matthew S. Abrahams, Portland, OR (US)

(72) Inventor: Matthew S. Abrahams, Portland, OR (US)

(*) Notice: Subject to any disclaimer, the term of this patent is extended or adjusted under 35 U.S.C. 154(b) by 0 days.

(21) Appl. No.: 14/522,967

(22) Filed: Oct. 24, 2014

(65) Prior Publication Data

US 2016/0114551 A1    Apr. 28, 2016

(51) Int. Cl.
*A47C 27/15* (2006.01)
*B32B 3/26* (2006.01)
*A63B 21/00* (2006.01)

(52) U.S. Cl.
CPC .............. *B32B 3/266* (2013.01); *A63B 21/1473* (2013.01); *B32B 2307/744* (2013.01); *B32B 2471/04* (2013.01)

(58) Field of Classification Search
CPC .. A63B 21/1473; A47C 27/146; A47C 27/15; Y10T 428/24314
USPC .......................................................... 52/177
See application file for complete search history.

(56) References Cited

U.S. PATENT DOCUMENTS

| | | | | |
|---|---|---|---|---|
| 3,459,400 A | * | 8/1969 | Rothermel | F16F 1/3737 248/636 |
| 3,512,190 A | * | 5/1970 | Buff | A47C 27/146 297/452.48 |
| 4,955,096 A | * | 9/1990 | Gilroy | A47C 27/148 5/730 |
| 5,025,519 A | * | 6/1991 | Spann | A61G 7/05707 5/724 |
| 5,160,785 A | * | 11/1992 | Davidson, Jr. | A47C 27/146 297/DIG. 1 |
| 5,643,139 A | * | 7/1997 | Stout | A63B 6/02 482/14 |
| 5,677,036 A | * | 10/1997 | Kording | A61F 5/01 428/156 |
| 6,408,446 B1 | * | 6/2002 | Carrington | A41D 13/0506 2/23 |
| 229,500 A1 | | 9/2008 | Chien-Jen Lin | |
| 7,426,767 B2 | * | 9/2008 | Mossbeck | A47C 27/144 5/652.1 |
| 13,472 A1 | | 1/2009 | Koffler | |
| 7,485,071 B2 | | 2/2009 | Edwards | |
| D671,784 S | | 12/2012 | Gallie, II | |
| 2004/0250346 A1 | | 12/2004 | Vasishth | |
| 2008/0229500 A1 | | 9/2008 | Lin | |
| 2009/0013472 A1 | | 1/2009 | Koffler et al. | |

FOREIGN PATENT DOCUMENTS

| | | |
|---|---|---|
| CN | 203290675 | 11/2013 |
| JP | 2009179984 | 8/2009 |
| RU | 96064 U1 | 10/2015 |

* cited by examiner

*Primary Examiner* — Rodney Mintz
*Assistant Examiner* — Daniel Kenny
(74) *Attorney, Agent, or Firm* — Mohr Intellectual Property Law Solutions, PC

(57) ABSTRACT

Anti-slip coverings for underlying surfaces are shown and described. The anti-slip coverings include a first layer made of a semi-flexible material that is configured to receive contact from an object and has slits at least partially extended through the first layer. The slits are configured to at least partially open when one or more of a downward force and a horizontal force is applied by the object onto the anti-slip covering In some examples, the anti-slip covering includes a second layer disposed between the first layer and the underlying surface to allow compression of the first layer when a downward force is applied on the anti-slip covering.

17 Claims, 15 Drawing Sheets

ANTI-SLIP COVERINGS FOR SURFACES

BACKGROUND

The present disclosure relates generally to anti-slip coverings to resist slippage of objects over surfaces. In particular, anti-slip coverings including a top layer with a plurality of slits and an underlying deformation-permitting layer are described.

Anti-slip coverings (e.g., anti-slip mats) are used to limit undesired slippage over a surface. Often anti-slip coverings are often comprised of a high-traction compressible material, such as rubber. Further, conventional anti-slip coverings include a textured surface, such as a dimpled surface.

Known anti-slip coverings and mats are not entirely satisfactory for the range of applications in which they are employed. For example, existing anti-slip coverings are inefficient in preventing slippage of objects in wet conditions. In addition, conventional anti-slip coverings include large cutouts that are unsuitable and/or uncomfortable for use with some objects (e.g., bare hands, feet, abdomen, and/or back of a user).

Thus, there exists a need for anti-slip coverings that improve upon and advance the design of known anti-slip coverings and mats. Examples of new and useful anti-slip coverings relevant to the needs existing in the field are discussed below.

Disclosure addressing one or more of the identified existing needs is provided in the detailed description below. Examples of references relevant to anti-slip coverings and mats include U.S. Patent References: U.S. Pat. No. 7,485,071, design Pat. D671784, patent publication 2004250346, patent publication 20080229500, and patent publication 20090013472. The complete disclosures of the above patents and patent applications are herein incorporated by reference for all purposes.

SUMMARY

The present disclosure is directed to anti-slip coverings for underlying surfaces. The anti-slip coverings include a first layer made of a semi-flexible material that is configured to receive contact from an object and has slits at least partially extended through the first layer. The slits are configured to at least partially open when one or more of a downward force and a horizontal force are applied by the object onto the anti-slip covering In some examples, the anti-slip covering includes a second layer disposed between the first layer and the underlying surface to allow compression of the first layer when a downward force is applied on the anti-slip covering.

DETAILED DESCRIPTION

The disclosed anti-slip coverings will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various anti-slip coverings are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-14, first and second examples of an anti-slip coverings for an underlying surfaces, anti-slip covering 100 and 200, will now be described. Anti-slip coverings 100 and 200 include a siping pattern 102 comprised of a plurality of slits 104. Each of the slits is compressible to be moved into a partially open state. Anti-slip coverings 100 and 200 functions to resist slippage of an object (e.g., a user) when a downward force and/or a horizontal force are applied on the anti-slip covering. Additionally or alternatively, anti-slip coverings 100 and 200 can be used to resist slippage of an object even when a surface of the anti-slip covering is wet.

Figure 1:
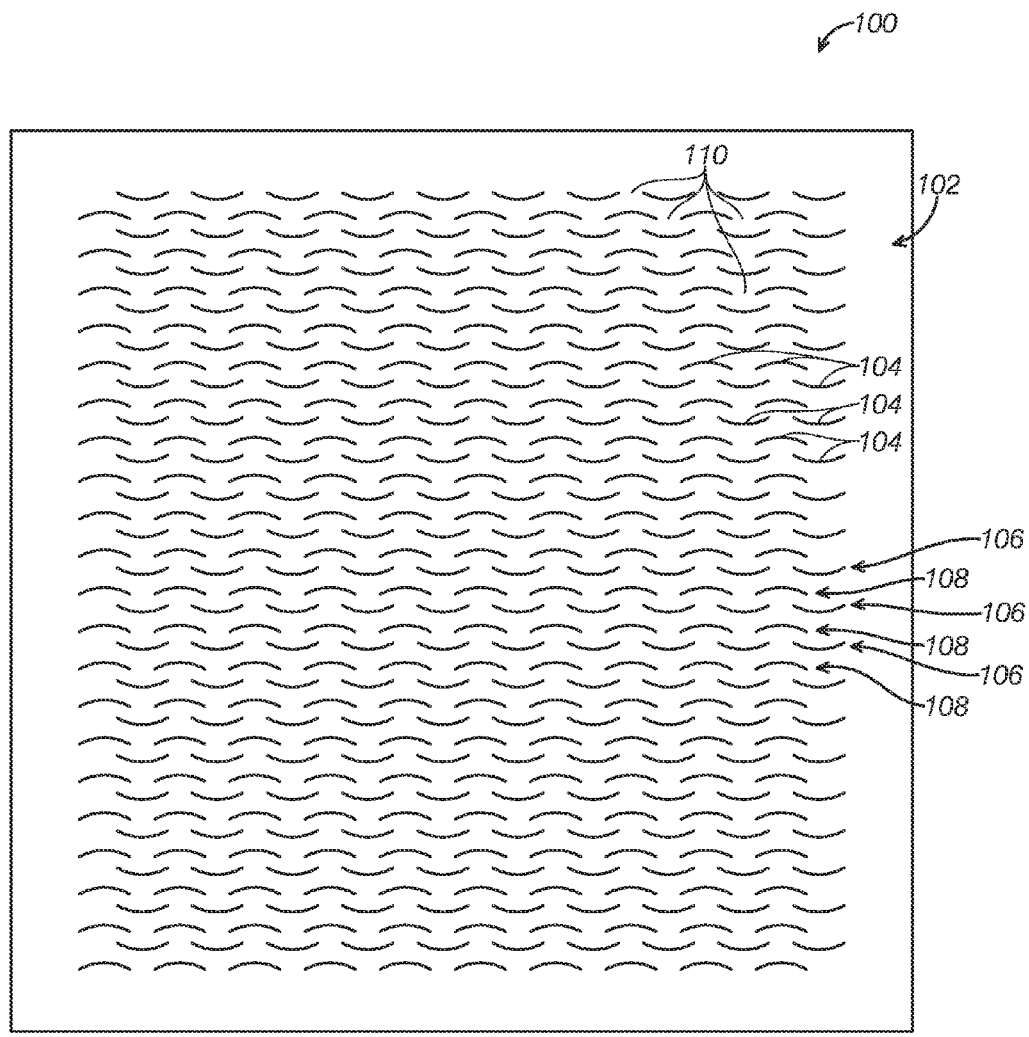
FIG. 1 is a top plan view of a first example of an anti-slip covering.

As can be seen in FIG. 1, siping pattern 102 includes laterally arranged rows 106 and 108 of slits 104. Slits 104 are generally curvilinear (e.g., crescent shaped) slits. Further, slits 104 extend at least partially through anti-slip covering 100. In some examples, the slits extend through anti-slip covering 100. Slits 104 are aligned end to end and a solid spacer 110 is disposed between each end of the slits.

Rows 106 and 108 are adjacent rows of slits. In rows 106, the slits are curved in a first direction, and in rows 108, the slits are curved in a second opposing direction. Further, slits in rows 106 are offset relative to slits in rows 108. In other words, each slit 104 in rows 106 is longitudinally aligned with one of spacers 110 in rows 108. Further, each slit 104 in rows 108 is longitudinally aligned with one of spacers 110 in rows 106.

Anti-slip covering 100 is comprised of a semi-flexible material. In the present example, the anti-slip covering is comprised of recycled rubber. In other examples, the anti-slip covering can be comprised of a different semi-flexible material, such as natural rubber, synthetic rubber, neoprene, silicone, gel, open-cell sponge, closed-cell sponge, foam, cork, fabric, leather, fibers, or composite of some of the previously listed materials. It will be appreciated that the anti-slip covering can be comprised of any semi-flexible material known or yet to be discovered.

Figure 2:
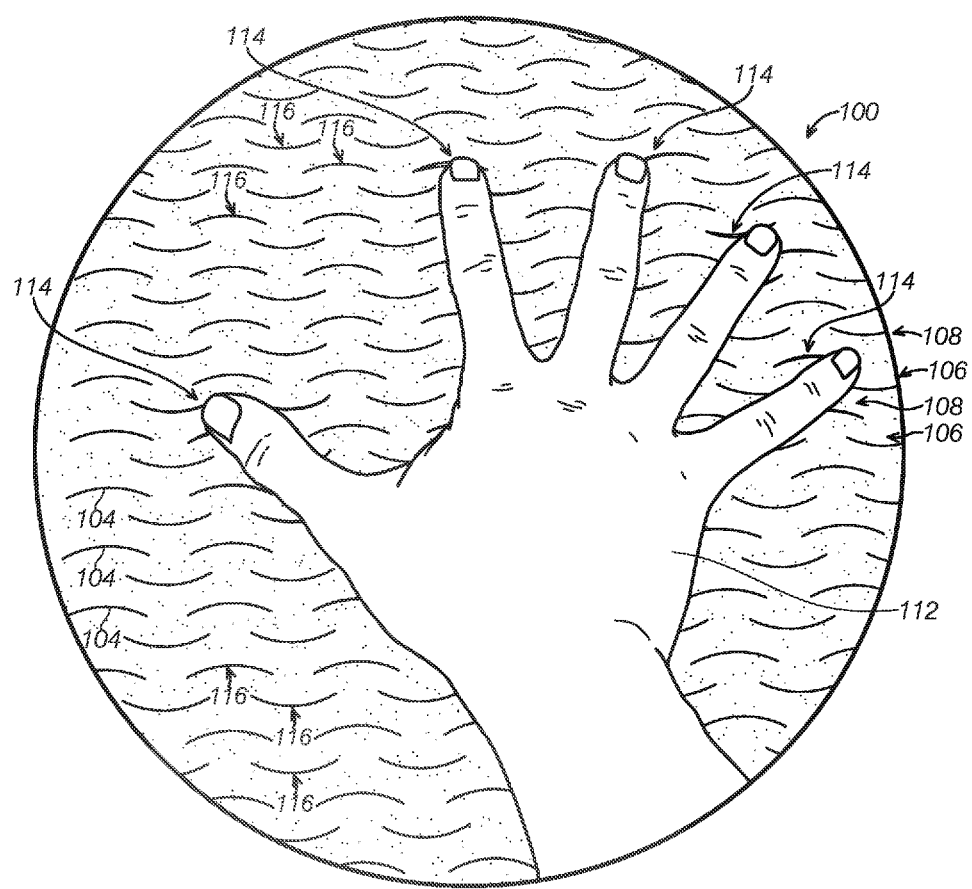
FIG. 2 is a top plan view of the first example of an anti-slip covering shown in FIG. 1 with a downward force being applied on the anti-slip covering by a user.

As shown in FIG. 2, anti-slip covering 100 is configured to receive a downward and/or horizontal force from an object, such as a hand 112 of a user. In this example, hand 112 applies a downward and horizontal force on anti-slip mat 100. Application of the force on the anti-slip mat causes the slits that are proximal to and/or in contact with hand 112 to move into a partially open state 116. Others of the slits that are not proximal to and/or in contact with hand 112 remain in a substantially unopened (i.e., closed) state 116.

Figure 3:
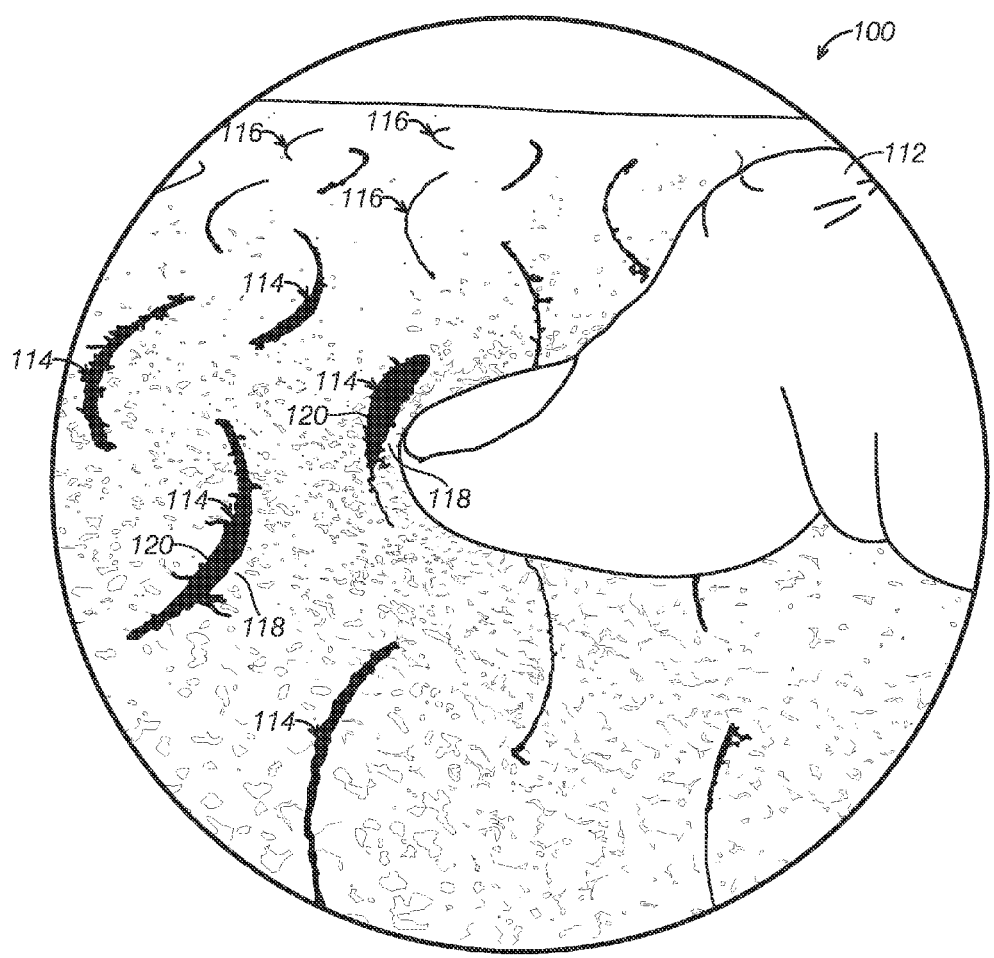
FIG. 3 is a perspective view of slits in a first layer of the first example of an anti-slip covering shown in FIG. 1, the slits shown in a closed configuration and a partially open configuration.
Figure 4:
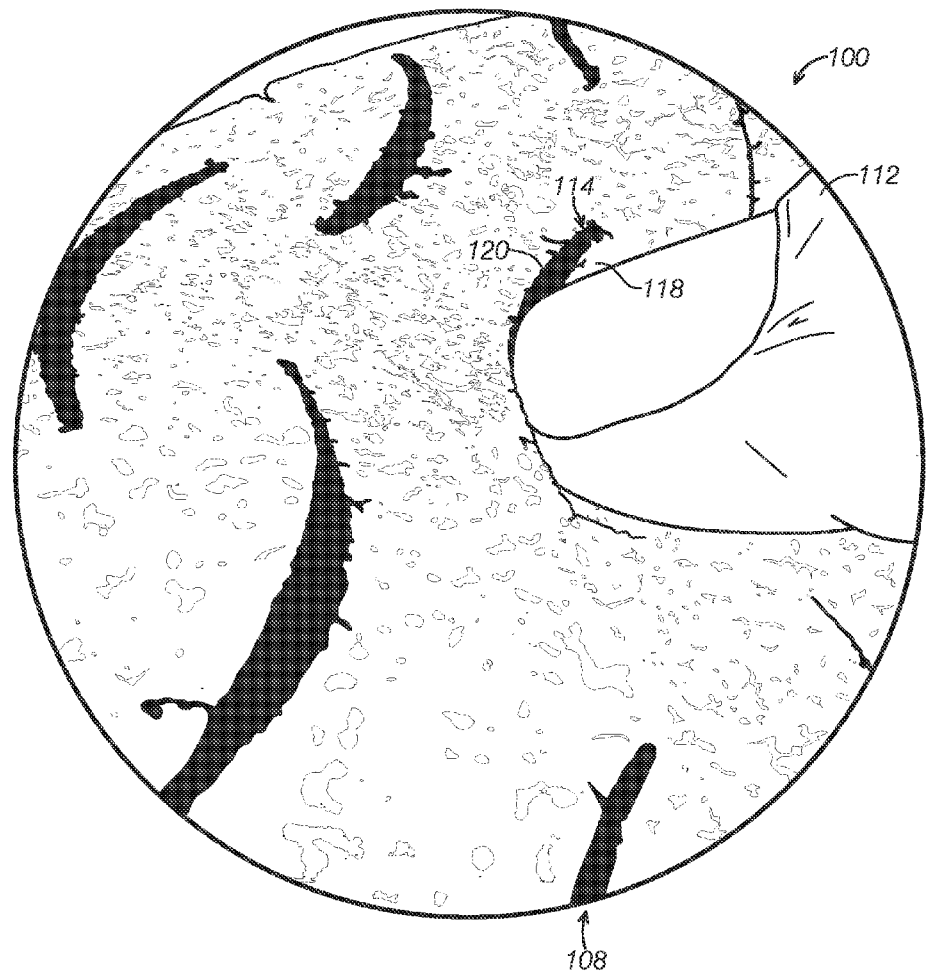
FIG. 4 is a perspective view of a first example user engagement with a partially open slit.
Figure 5:
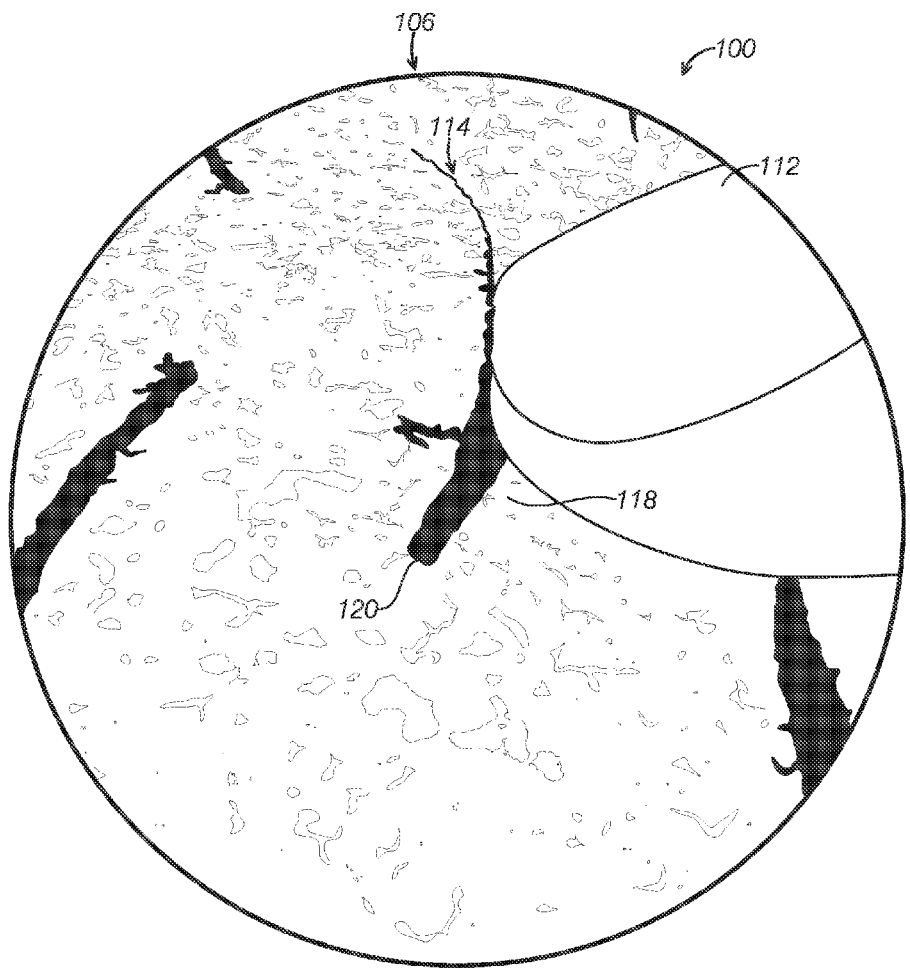
FIG. 5 is a perspective view of a second example user engagement with a partially open slit.

FIG. 3 shows a detailed view of slits 104 in partially opened state 114. Each slit that is in partially opened state 114, includes an inclined floor 118 and an exposed side wall 120. Inclined floor 118 is a downward slope toward exposed side wall 120. As shown in FIGS. 4 and 5, the exposed side wall is configured to be abutted to the object applying the downward and/or horizontal force on the anti-slip covering. In one example, shown in FIG. 4, the curvature of the slit is curved toward the object (i.e., hand 112) and is one of the slits of row 108. Additionally or alternatively, as shown in FIG. 5, the curvature of the slit can be curved away from the object and be one of the slits in row 106.

The sidewall is configured to provide a bracing force against the object to resist slippage of the object over the surface of the anti-slip covering when the object is abutted to the side wall. As shown in FIG. 2, multiple partially opened slits can cooperatively work together to resist slippage of the object over the surface of the anti-slip covering when multiple side walls are abutted to the object. It will be appreciated that in the example shown in FIG. 4, where the curvature of the slit is curved toward the object, the object can have a greater surface area of contact. In this example, the slit may provide a greater bracing force than when the slit is curved away from the object. It will be appreciated that in alternate examples the slits can have an alternate configuration (e.g., linear, serrated, triangulated, greater or lesser degree of curvature, etc.).

It will be appreciated that in some examples, the anti-slip covering can include a single layer through which the slits are extended. In other examples, the anti-slip covering can include more than one layer. For example, the anti-slip mat can comprise a top layer including the slits and an underlying layer. The underlying layer can be an underlying deformation-permitting layer between the top layer and the underlying surface that allows a greater degree of compression of the top layer and thereby a greater degree of opening of the slits when a downward force is applied on the anti-slip covering.

As the slits are able to open to a greater degree, the exposed wall of the slits can have a greater surface area and provide a greater bracing force on the object to prevent slippage. Turning now to FIGS. 6-11, example anti-slip coverings including underlying deformation-permitting layers are shown and described.

Figure 6:
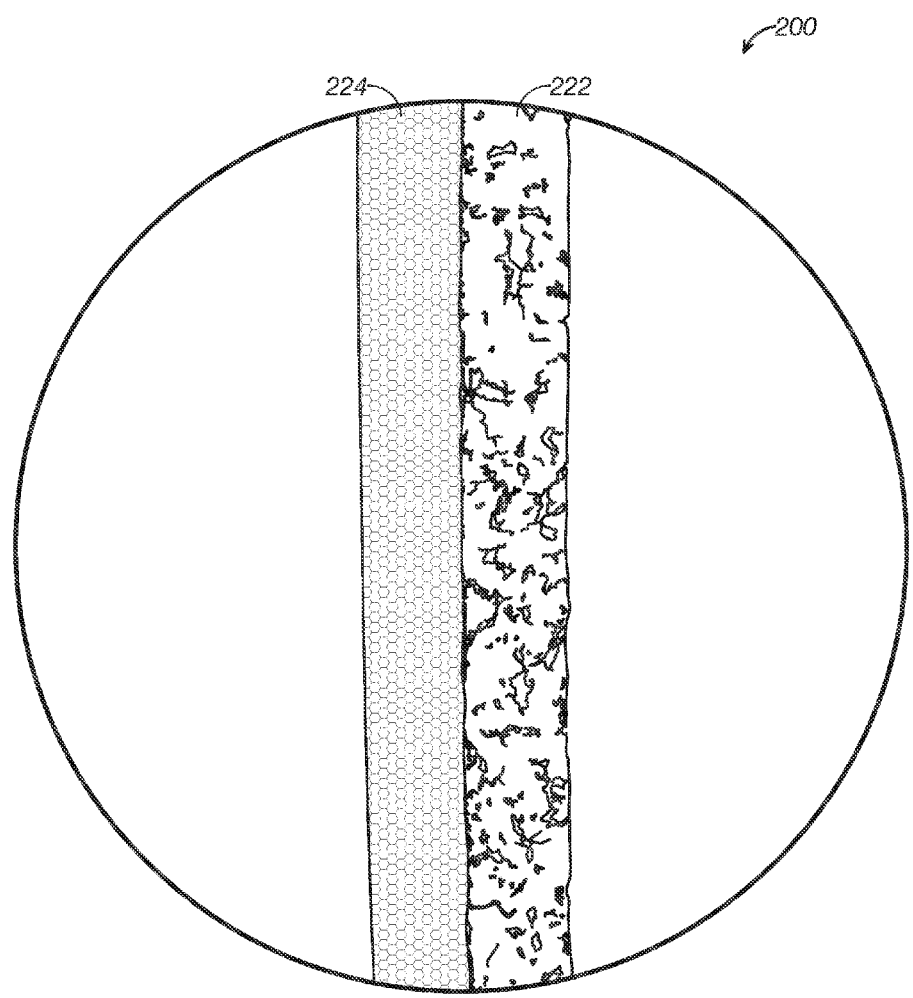
FIG. 6 is a side elevation view of a second example of an anti-slip covering with a first example underlying deformation-permitting layer.

An anti-slip covering 200 including a first example deformation-permitting layer is shown in FIG. 6. As shown in FIG. 6, anti-slip covering 100 includes a top layer 222 having the configuration shown in FIGS. 1-5 and described above. In this example, anti-slip covering 200 further includes an underlying deformation-permitting layer 224. Deformation-permitting layer 224 is comprised of a more flexible and/or compressible material than top layer 222, such as a more flexible and/or compressible recycled rubber. Deformation-permitting layer 224 allows compression, flex, and/or deformation (i.e., opening of the slits) of top layer 222 because it is comprised of the more compressible, flexible, and/or deformable material.

In other examples, the deformation-permitting layer can be comprised of a different flexible material, such as natural rubber, synthetic rubber, neoprene, silicone, gel, open-cell sponge, closed-cell sponge, foam, cork, fabric, leather, fibers, or composite of some of the previously listed materials. Additionally, the deformation-permitting layer can include integral compartments filled with pressurized gas, an inflatable bladder, springs, piezoelectric material, and electronic equipment. Further, deformation-permitting layer 224 can be affixed to top layer 222 via an adhesive, such as force-sensitive adhesive, epoxy, and/or contact cement. Alternatively or additionally, the deformation-permitting layer can be affixed to the top layer via thermal bonding, stitching, temporary closures (e.g. buttons, snaps, Velcro, ties), magnets, and/or interdigitating processes.

Figure 7:
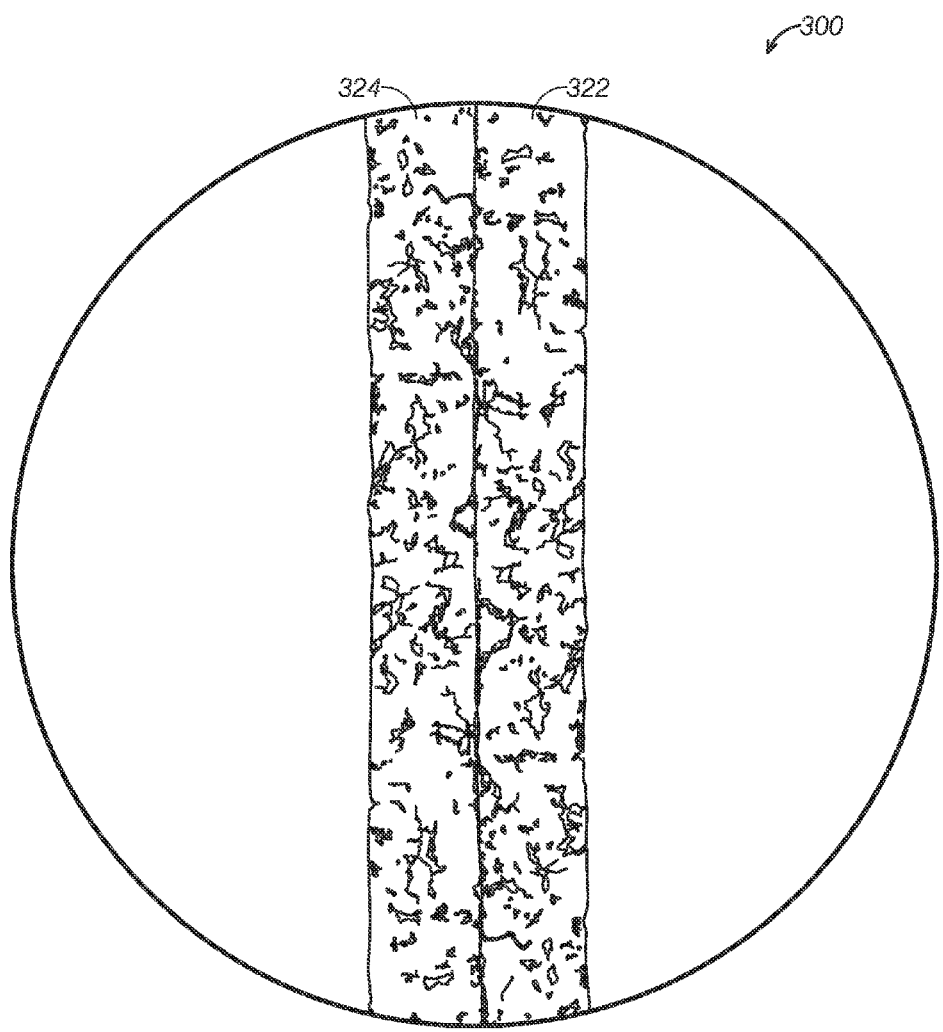
FIG. 7 is a side elevation view of a third example of an anti-slip covering with a second example underlying deformation-permitting layer including a cutout pattern.

Turning attention to FIG. 7, an anti-slip covering 300 including a second example deformation-permitting layer is shown and described. Anti-slip covering 300 includes many similar or identical features to anti-slip covering 200. Thus, for the sake of brevity, each feature of anti-slip covering 300 will not be redundantly explained. Rather, key distinctions between anti-slip covering 300 and anti-slip covering 200 will be described in detail and the reader should reference the discussion above for features substantially similar between the two anti-slip coverings.

As can be seen in FIG. 7, anti-slip covering 300 includes top layer 322 having the configuration shown in FIGS. 1-5 and described above. In this example, anti-slip covering 300 further includes an underlying deformation-permitting layer 324. Deformation-permitting layer 324 is comprised of an identical material to top layer 322. Deformation-permitting layer 324 can be affixed to top layer 322 via an adhesive, such as force-sensitive adhesive, epoxy, and/or contact cement. Alternatively or additionally, the deformation-permitting layer can be affixed to the top layer via co-molding of the two layers, thermal bonding, stitching, temporary closures (e.g. buttons, snaps, Velcro, ties), magnets, and/or interdigitating processes.

Deformation-permitting layer 324 allows compression, flex, and/or deformation of top layer 322 because the deformation-permitting layer includes a cut-out pattern and/or cut-out spaces that are disposed below the top layer. Deformation-permitting layer 324 thereby is configured to support the overlying layer (i.e., top layer 322) and allow compression, flex, and/or deformation of the overlying layer into spaces of the cut-out pattern.

Figure 8A:
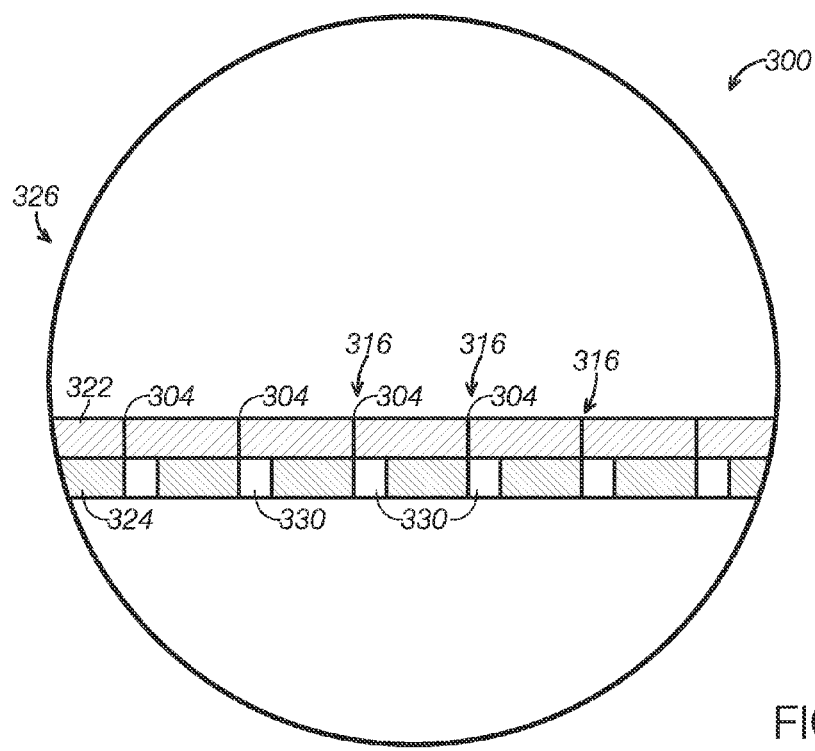
FIGS. 8A and 8B are cross-sectional views showing the third example anti-slip covering in a non-compressed state and a compressed state, respectively.
Figure 8B:
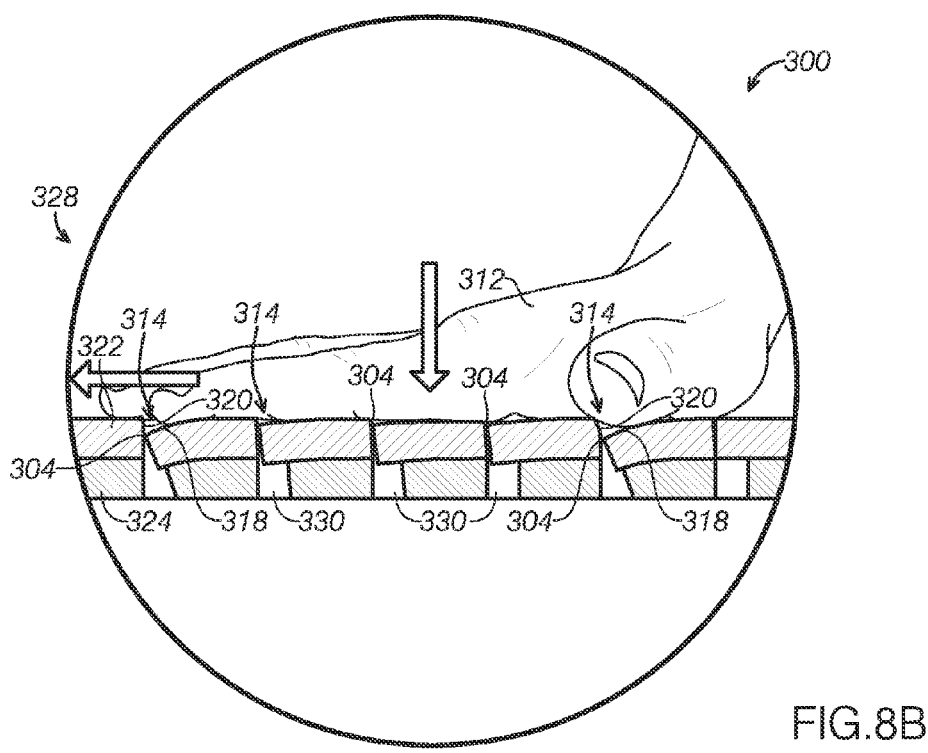
Figure 9A:
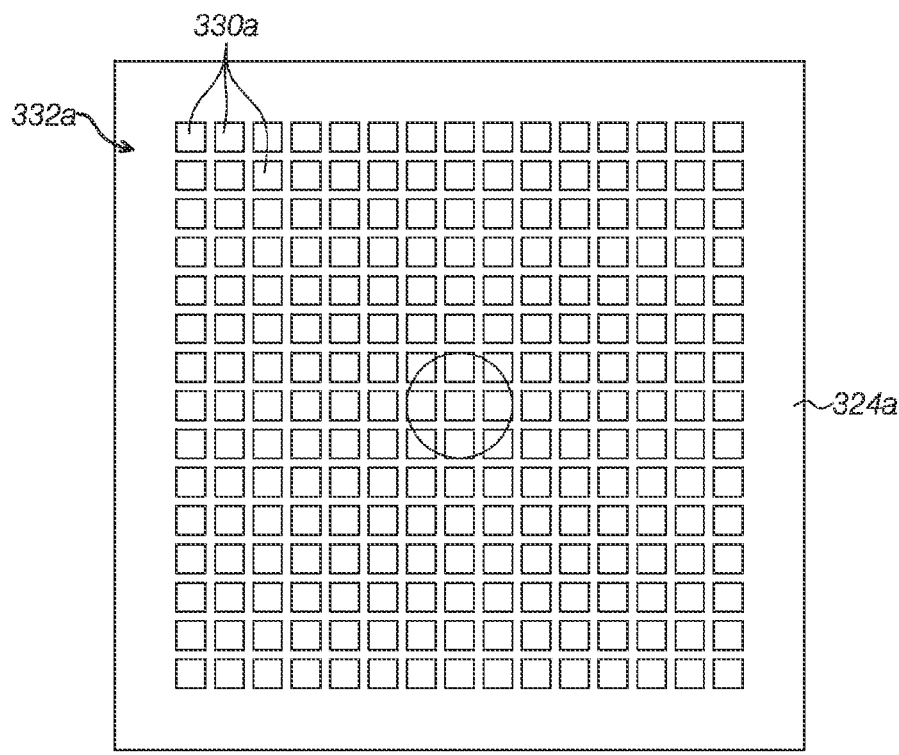
FIGS. 9A and 9B are top plan views of the second example underlying deformation-permitting layer including a first example cutout pattern.
Figure 9B:
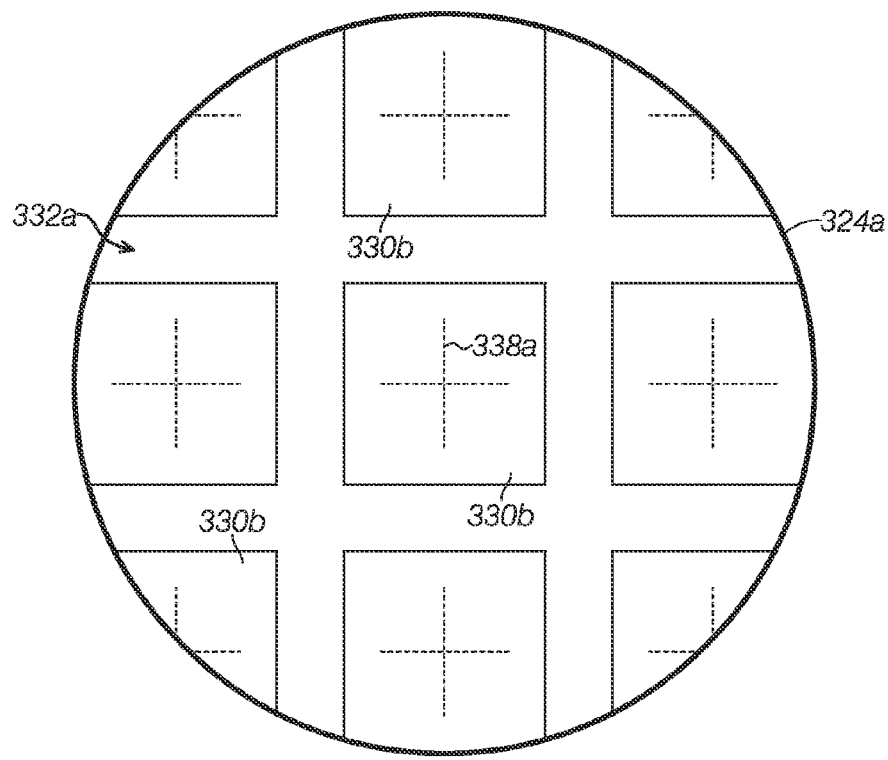

As depicted in FIGS. 8A and 8B, anti-slip covering 326 is moveable, flexible, and/or deformable between a non-compressed state 326 (shown in FIG. 8A) and a compressed state 328 (shown in FIG. 8B). In non-compressed state 326, no significant forces are exerted on the mat and slits 304 are in unopened state 316. Further, in non-compressed state 326, material of the top layer 322 does not extend into spaces 330 in deformation-permitting layer 324.

Contrastingly, in compressed state 328 a user's hand 312 exerts a downward and horizontal force (represented by arrows) on anti-slip covering 300. Hand 312 applies the force directly to top layer 322. As a result of the applied force, one or more of slits 304 are moved in to at least partially opened state 314. As described above, in partially opened state 314, each slit 304 is deformed and/or flexed to include an inclined floor 318 and an exposed side wall 320. Thus, a portion of top layer 322 is extended into spaces 330. Exposed side walls 320 are configured to be abutted to the object applying the force (i.e., the user's hand) and provide a bracing force against the object to resist slippage of the object over the surface of the anti-slip covering when the object is abutted to the side wall. Multiple partially opened slits can cooperatively work together to resist slippage of the object over the surface of the anti-slip covering when multiple side walls are abutted to the object.

Specific examples of deformation-permitting layers 324 (324*a*-324*d*) are shown in FIGS. 9-12. Deformation-permitting layer 324*a* is shown in FIGS. 8A and 8B. Deformation-permitting layer 324*a* includes a cutout pattern 332*a*, which is a grid pattern comprised of a plurality of square cutouts 330*a*. It will be appreciated that in alternate examples the cut outs can have a cut-out pattern with a different shape (e.g., rectangular, triangular, star-shaped, etc.). Additionally or alternatively, the grid pattern can include cutouts are larger or smaller dimensions. Dashed lines 338*a* shown in FIG. 9B represent the location of slits in the top layer. In this example, the top layer slits are in a cross-pattern. In other examples, the slit pattern can include the pattern shown in FIGS. 1-5.

Figure 10A:
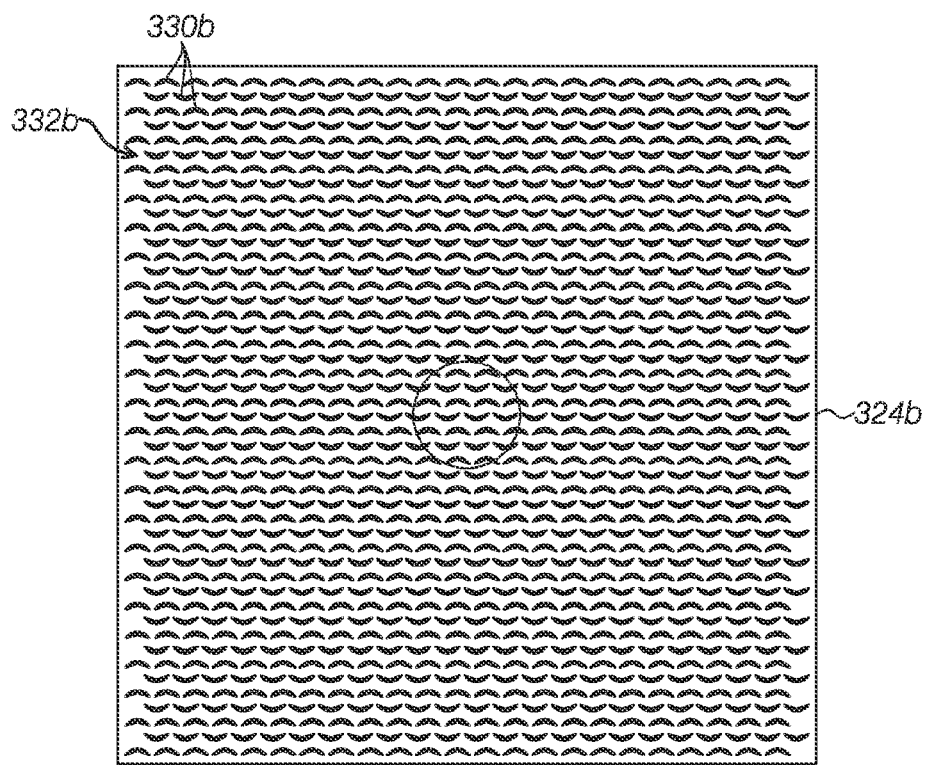
FIGS. 10A and 10B are top plan views of the second example underlying deformation-permitting layer including a second example cutout pattern.
Figure 10B:
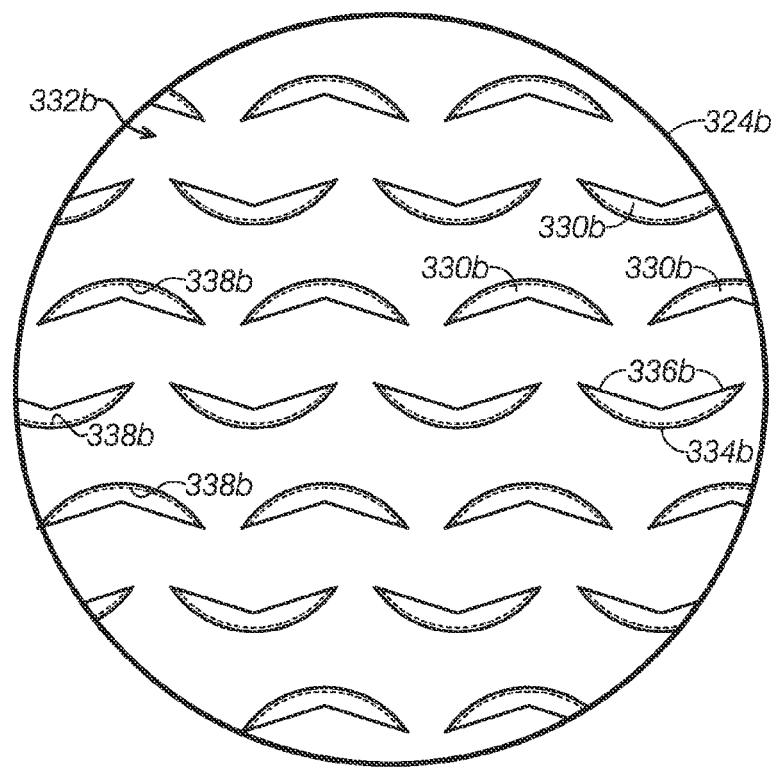

FIGS. 10A and 10B show an example deformation-permitting layer 324*b*. Deformation-permitting layer 324*b* includes a cutout pattern 332*b*, which is a crescent pattern comprised of a plurality of crescent shaped cutouts 330*b*. Specifically, cutouts 330*b* include a continuously curved outer curvature 334*b* and an inner curvature comprised of linear intersecting lines 336*b*. Linear intersecting lines 336*b* intersect proximal to a center of outer curvature 334*b*. Dashed lines 338*b* represent the location of slits in the top layer. Similar to the top layer, cutout pattern 338*b* includes laterally arranged rows of linearly arranged cutouts, where each row include cutouts that are offset and have an opposing curvature relative to cutouts in adjacent rows.

Figure 11A:
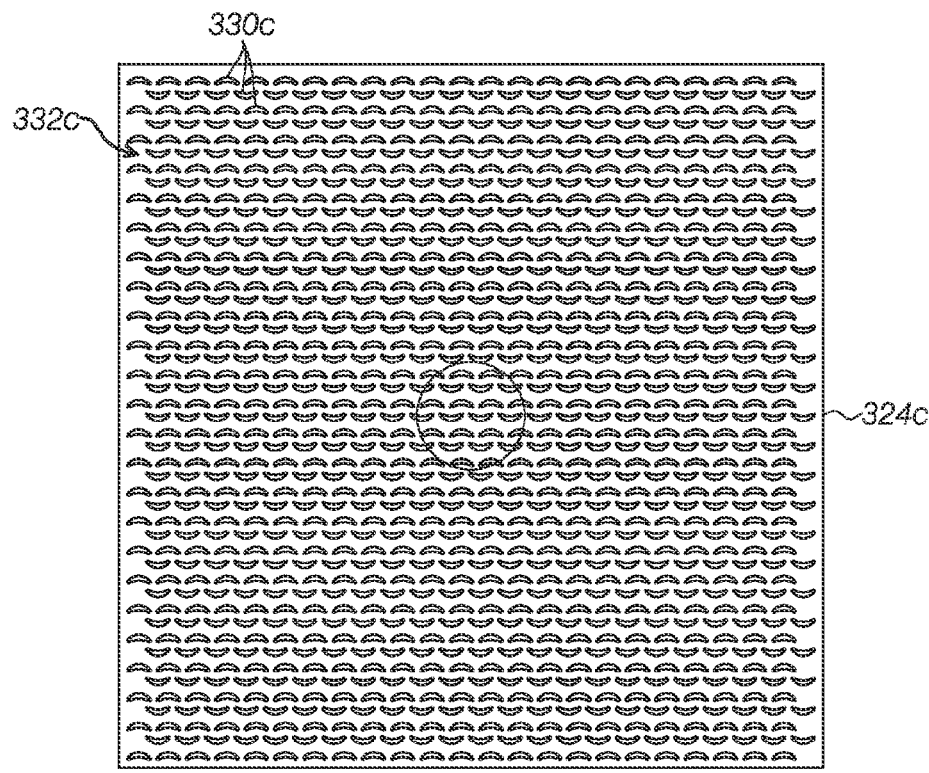
FIGS. 11A and 11B are top plan views of the second example underlying deformation-permitting layer including a third example cutout pattern.
Figure 11B:
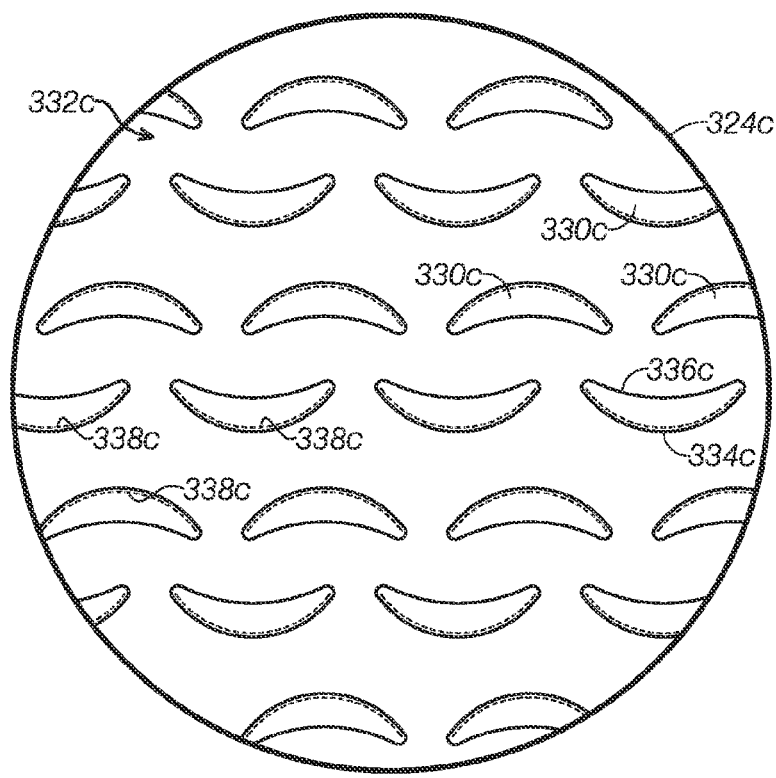

FIGS. 11A and 11B show an example deformation-permitting layer 324*c*. Deformation-permitting layer 324*c* includes a cutout pattern 332*c*, which is a crescent pattern comprised of a plurality of crescent shaped cutouts 330*c*. Specifically, cutouts 330*c* include an outer curvature that is a continuously curved outer curve 334*c* and an inner curvature that is a continuously curved inner curve 336*c*. Dashed lines 338*c* represent the location of slits in the top layer. Similar to the top layer, cutout pattern 332*c* includes laterally arranged rows of linearly arranged cutouts, where each row include cutouts that are offset and have an opposing curvature relative to cutouts in adjacent rows.

Figure 12A:
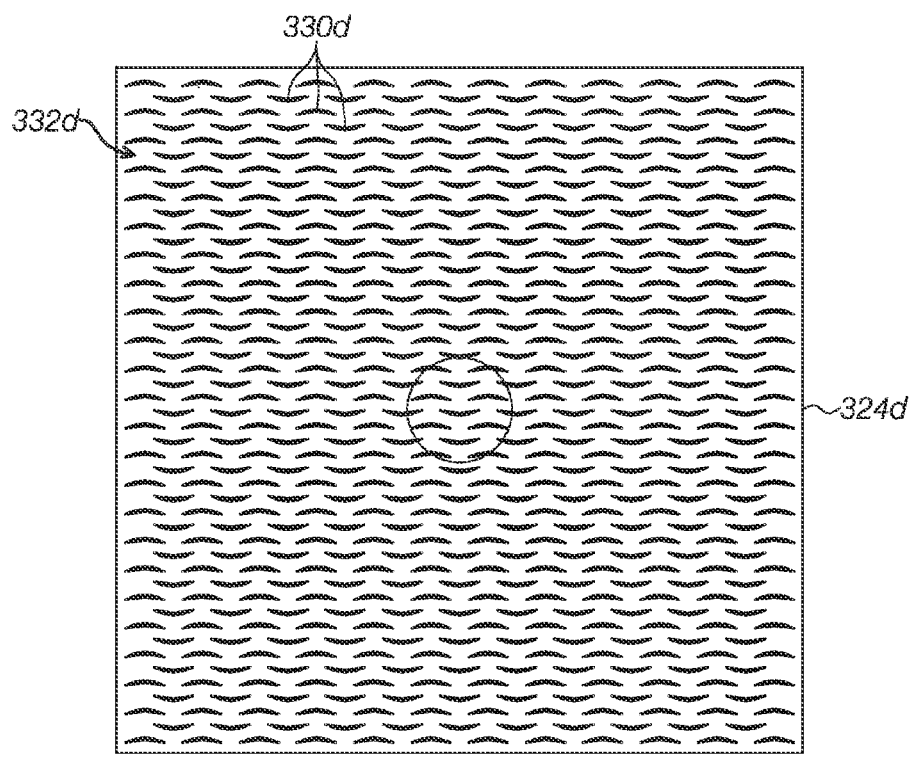
FIGS. 12A and 12B are top plan views of the second example underlying deformation-permitting layer including a fourth example cutout pattern.
Figure 12B:
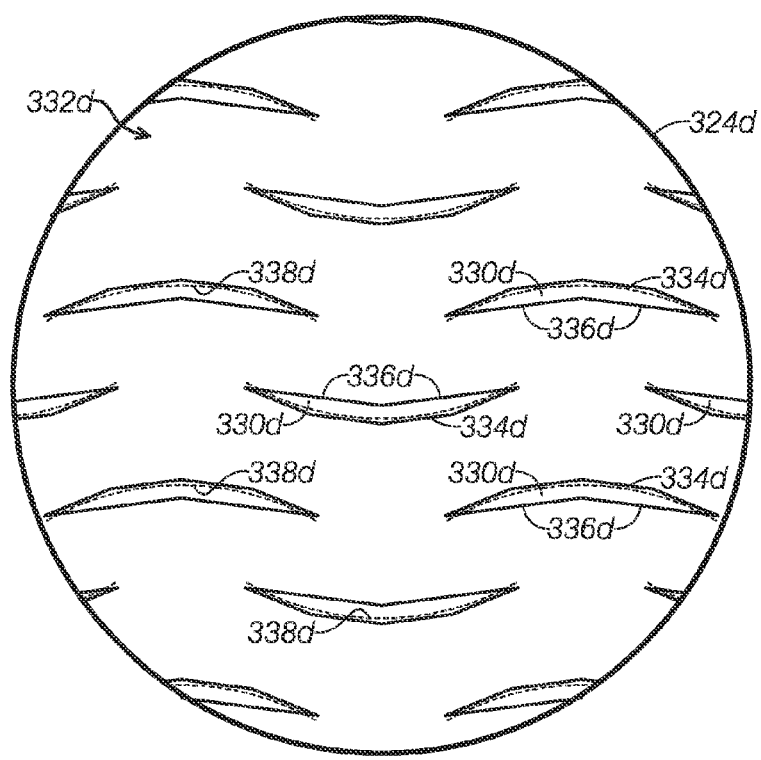

FIGS. 12A and 12B show an example deformation-permitting layer 324*d*. Deformation-permitting layer 324*d* includes a cutout pattern 332*d*, which is a crescent pattern comprised of a plurality of crescent shaped cutouts 330*d*. Specifically, cutouts 330*d* include an outer curvature comprised of an continuously curved and articulated (i.e., comprised of multiple short linear lines) outer curve 334*d* and an inner curvature comprised of linear intersecting lines 336*d*. Linear intersecting lines 336*d* intersect proximal to a center of outer curvature 334*d*. Dashed lines 338*d* represent the location of slits in the top layer. Similar to the top layer, cutout pattern 332*d* includes laterally arranged rows of linearly arranged cutouts, where each row include cutouts that are offset and have an opposing curvature relative to cutouts in adjacent rows.

Figure 13:
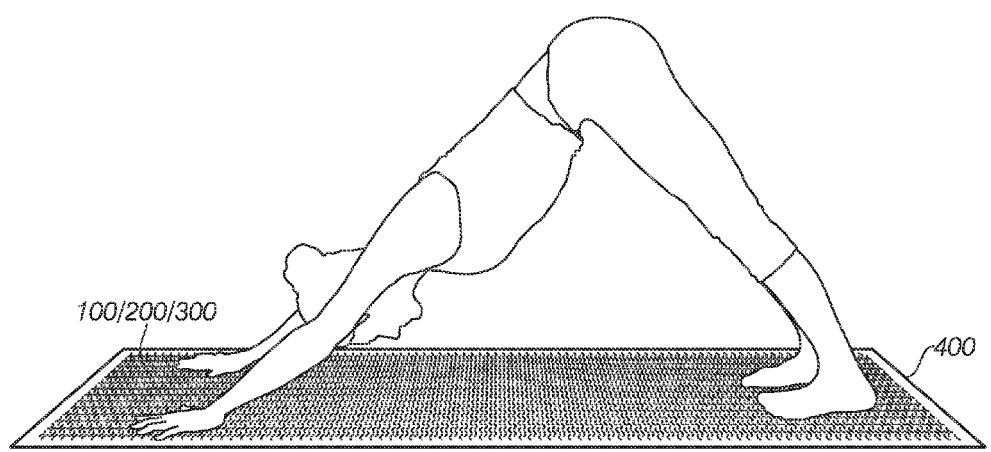
FIG. 13 is a perspective view of the first example anti-slip covering in use as an exercise mat.
Figure 14:
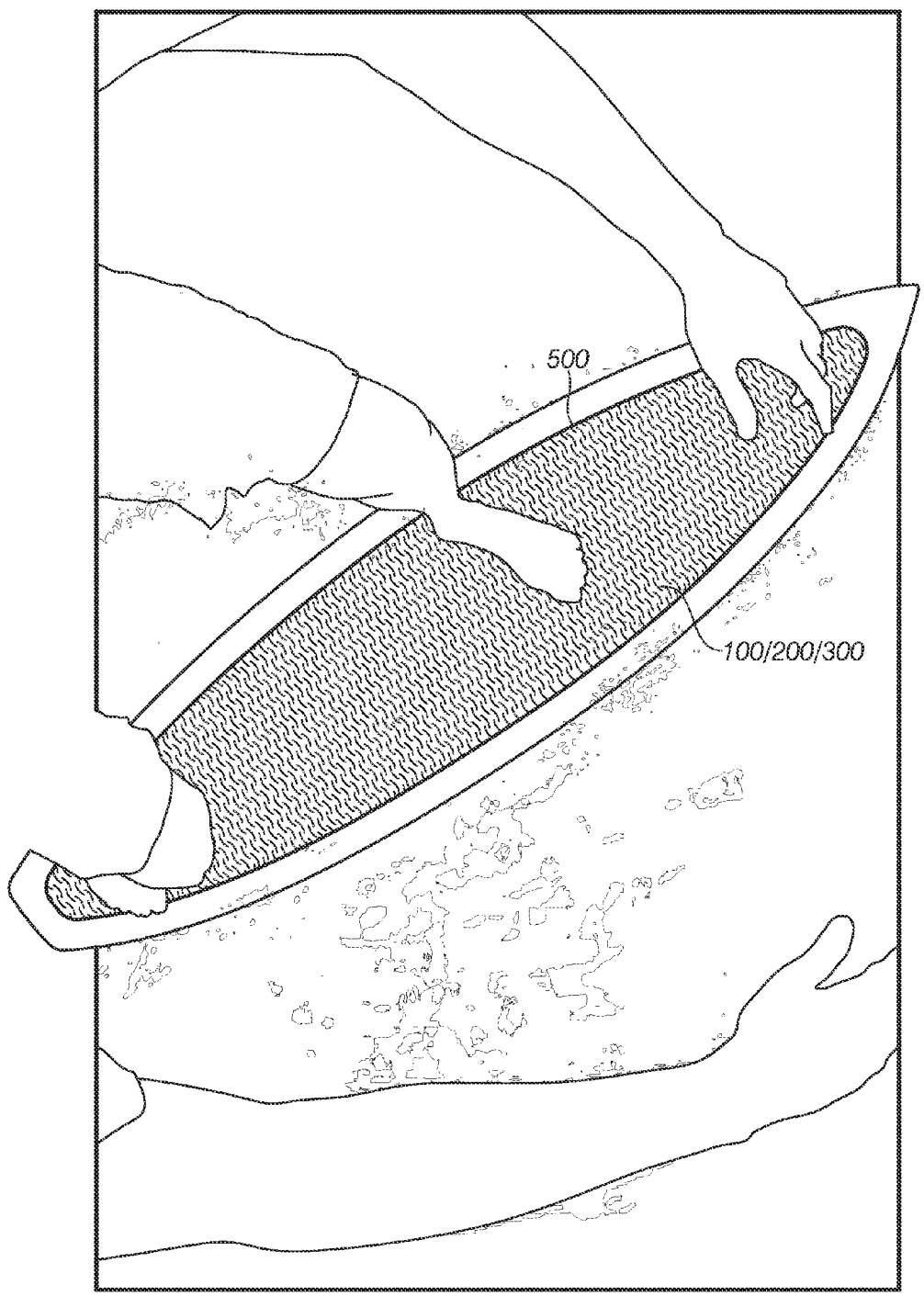
FIG. 14 is a perspective view of the first example anti-slip covering in use as a surfboard covering.
Figure 15:
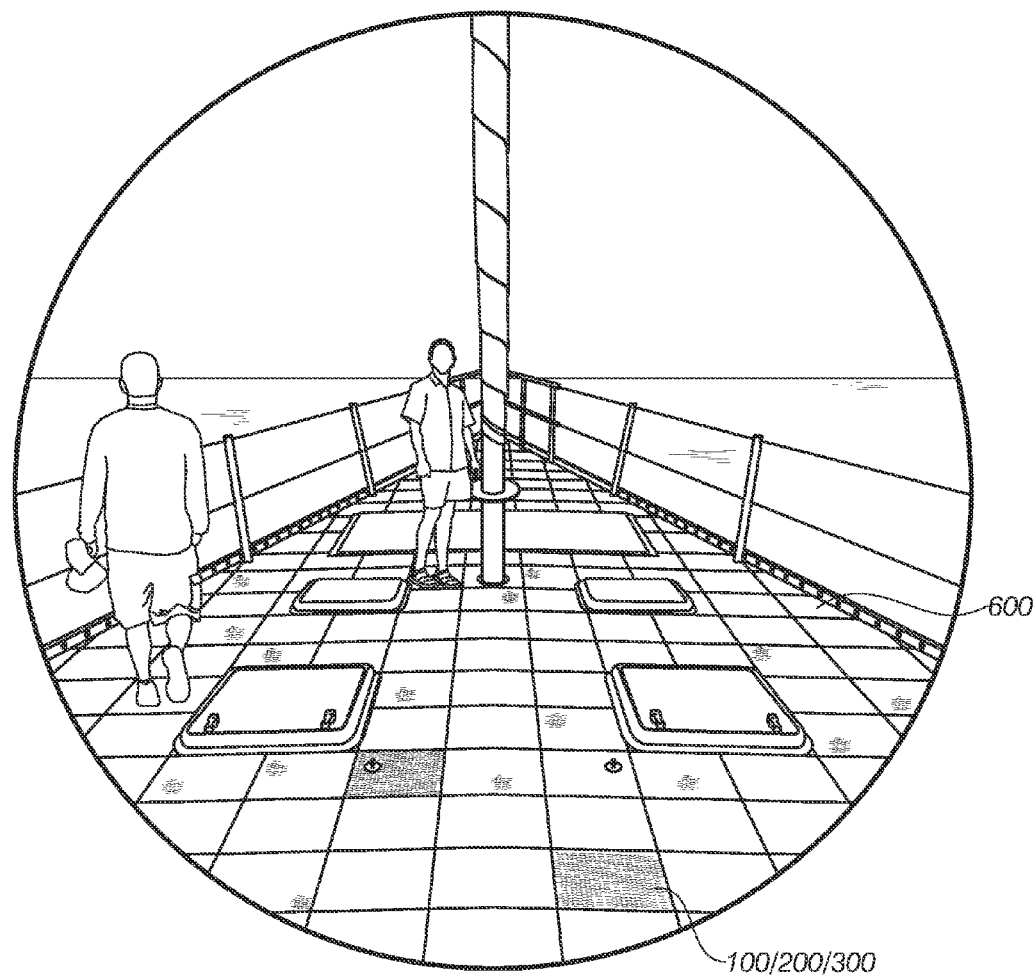
FIG. 15 is a perspective view of the first example anti-slip covering in use as a deck covering.

The above described anti-slip coverings 100, 200, and 300 can be used in many different applications where it is desirable to resist slippage of an object over a surface. The present examples of anti-slip coverings can be used to resist slippage in both wet and dry conditions. Various examples for use of the present examples of anti-slip coverings are shown in FIGS. 13-15. It will be appreciated that these are examples are not limiting and the anti-slip covering can be used in application where resistance of slippage of an object over a surface is desirable.

It will be further appreciated that, in some examples, the anti-slip covering can be used in reverse, such that the deformation-permitting layer is disposed on above the "top" layer. In these examples, the deformation-permitting layer would come into contact with the object and receive the downward and/or horizontal force from the object. It may be advantageous to use the anti-slip in such an orientation in very wet conditions so that water can be captured in the spaces and drained through the slits in the "top" layer. In still other examples, the deformation-permitting layer can used alone and exclude the top layer.

In a first example, shown in FIG. 13, anti-slip covering 100, 200, or 300 can be used as an exercise mat 400. In this example, the anti-slip covering can be used to prevent slippage of a user's hands and/or feet over a floor surface. In some cases, exercise mat 400 is a dry surface. In some cases where the user sweats onto the mat, exercise mat 400 can be a wet surface. In both cases, the anti-slip covering can be used to prevent slippage of the user's hands, feet, or other body parts in contact with the exercise mat.

In a second example, shown in FIG. 14, anti-slip coverings 100, 200, or 300 can be used as a surface for a surfboard 500. In this example, the anti-slip covering can be used to prevent slippage of a user's hands, feet, or other body parts over the surface of the surfboard. In general, the surface of the surfboard is wet during use. It will be appreciated that the anti-slip covering can be used on other water sport boards (e.g., stand up paddle boards, skim boards, windsurfing boards, etc.).

In a third example, shown in FIG. 15, anti-slip coverings 100, 200, or 300 can be used as a surface for a boat deck 600. In this example, the anti-slip covering can be used to prevent slippage of a user's hand, feet, or other body parts over the surface of the deck. In some cases, deck surface 600 is a dry surface. In some cases where water splashes onto the deck, deck surface 600 can be a wet surface. In both cases, the anti-slip covering can be used to prevent slippage of the user over the surface.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An anti-slip covering for an underlying surface, comprising:
    a layer made of a semi-flexible material and configured to receive contact from an object, the layer having a plurality of slits at least partially extended through the layer,
    wherein the plurality of slits are configured to at least partially open when one or more of a downward force and a horizontal force is applied by the object onto the anti-slip covering; and
    wherein the layer has a cut-out pattern defining a plurality of underlying open spaces; and
    wherein the cutout pattern is a plurality of crescent shaped cut outs, an outer curvature edge of each of the plurality of crescent shaped cuts outs being aligned with one of the plurality of slits.

2. The anti-slip covering of claim 1, wherein the layer defines a first layer and a second layer disposed between the first layer and the underlying surface to allow deformation of the first layer when a downward force is applied on the anti-slip covering.

3. The anti-slip covering of claim 1, wherein the semi-flexible material is a first material and the second layer is comprised of the first material, the second layer being one or more of bonded to and continuous with the first layer, and
    wherein the second layer has a cut-out pattern defining a plurality of underlying open spaces.

4. The anti-slip covering of claim 3, wherein the cutout pattern is a plurality of crescent shaped cut outs, an outer curvature edge of each of the plurality of crescent shaped cuts outs being aligned with one of the plurality of slits.

5. The anti-slip covering of claim 1, wherein the plurality of slits comprises a siping pattern, and
    wherein the siping pattern is at least a plurality of rows of curvilinear slits, a solid space being disposed between each slit in each of the plurality of rows of curvilinear slits, the plurality of rows of curvilinear slits being laterally extended across the anti-slip covering.

6. The anti-slip covering of claim 5, wherein the plurality of rows of curvilinear slits comprises at least a first row of slits aligned end to end and being identically curved in a first direction.

7. The anti-slip covering of claim 6, wherein the plurality of rows of curvilinear slits further comprises at least a second row of slits aligned end to end and being identically curved in a second direction, the second direction being an opposing direction relative to the first direction, the second row of slits being adjacent to the first row of slits.

8. The anti-slip covering of claim 7, wherein each slit in the first row of slits is longitudinally aligned with each solid space in the second row of slits and each slit in the second row of slits is longitudinally aligned with each solid space in the first row of slits.

9. The anti-slip covering of claim 1, wherein, when at least partially open, each of the plurality of slits comprises an inclined floor and an exposed side wall, the inclined floor being a downward slope toward the exposed side wall, the side wall being configured to be abutted to the object applying the downward force on the anti-slip covering.

10. The anti-slip covering of claim 9, wherein, the sidewall provides a bracing force against the object to resist slippage of the object over a surface of the anti-slip covering when the side wall is abutted to the object.

11. The anti-slip covering of claim 1, wherein the anti-slip covering comprises an exercise mat and the object comprises one or more body parts of a user.

12. An anti-slip covering for an underlying surface, comprising:
    a first layer made of a semi-flexible material and configured to receive contact from an object, the first layer having a plurality of slits through the first layer, and
    a second layer disposed between the first layer and the underlying surface to allow deformation of the first layer when one or more of a downward force and a horizontal force is applied on the anti-slip covering,
    wherein the plurality of slits are configured to at least partially open when a downward force is applied by the object onto the anti-slip covering, and
    wherein, when at least partially open, each of the plurality of slits comprises an inclined floor and an exposed side wall, the inclined floor being a downward slope toward the exposed side wall, the side wall being configured to be abutted to the object applying the downward force on the anti-slip covering, the sidewall providing a bracing force against the object to resist slipping of the object over a surface of the anti-slip covering when the side wall is abutted to the object.

13. The anti-slip covering of claim 12, wherein the semi-flexible material is a first material and the second layer is comprised of a second material, the second material being a foam sheet that is more flexible than the first material, and
    wherein the second layer is adhered to the first layer.

14. The anti-slip covering of claim 12, wherein the semi-flexible material is a first material and the second layer is comprised of the first material, the second layer being one or more of bonded to and continuous with the first layer, the second layer having a cut-out pattern defining a plurality of underlying open spaces.

15. The anti-slip covering of claim 12, wherein the plurality of slits comprises a siping pattern, the siping pattern being at least a plurality of rows of curvilinear slits, a solid space being disposed between each slit in each of the plurality of rows of curvilinear slits, the plurality of rows of curvilinear slits being laterally extended across the anti-slip covering, and
    wherein the plurality of rows of curvilinear slits comprises at least a first row of slits aligned end to end and being identically curved in a first direction and a second row of slits aligned end to end and being identically curved in a second direction, the second direction being an opposing direction relative to the first direction, the second row of slits being adjacent to the first row of slits.

16. The anti-slip covering of claim 12, wherein the anti-slip covering comprises an exercise mat and the object comprises one or more body parts of a user.

17. An anti-slip covering for an underlying surface, comprising:
- a first layer made of a semi-flexible material and configured to receive contact from an object, the first layer having a plurality of slits through the first layer; and
- a second layer disposed between the first layer and the underlying surface to allow compression of the first layer when one or more of a downward force and a horizontal force is applied on the anti-slip covering,
- wherein the plurality of slits are configured to at least partially open when a downward force is applied by the object onto the anti-slip covering,
- wherein, when at least partially open, each of the plurality of slits comprises an inclined floor and an exposed side wall, the inclined floor being a downward slope toward the exposed side wall, the side wall being configured to be abutted to the object applying the downward force on the anti-slip covering, the sidewall providing a bracing force against the object to resist slipping of the object over a surface of the anti-slip covering when the side wall is abutted to the object, and
- wherein the plurality of slits comprises a siping pattern, the siping pattern being at least a plurality of rows of curvilinear slits, a solid space being disposed between each slit in each of the plurality of rows of curvilinear slits, the plurality of rows of curvilinear slits being laterally extended across the anti-slip covering.

* * * * *